United States Patent
Kang et al.

(10) Patent No.: US 9,503,215 B2
(45) Date of Patent: Nov. 22, 2016

(54) INTERFERENCE SIGNAL CONTROL INFORMATION ACQUISITION METHOD AND APPARATUS FOR USE IN WIRELESS COMMUNICATION SYSTEM

(71) Applicant: Samsung Electronics Co., Ltd., Suwon-si, Gyeonggi-do (KR)

(72) Inventors: Hyungu Kang, Andong-si (KR); Seongwook Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 14/467,362

(22) Filed: Aug. 25, 2014

(65) Prior Publication Data

US 2015/0055591 A1 Feb. 26, 2015

Related U.S. Application Data

(60) Provisional application No. 61/869,260, filed on Aug. 23, 2013.

(30) Foreign Application Priority Data

Jan. 3, 2014 (KR) ........................ 10-2014-0000537

(51) Int. Cl.
*H04W 4/00* (2009.01)
*H04L 1/00* (2006.01)
*H04L 5/00* (2006.01)
*H04J 11/00* (2006.01)

(52) U.S. Cl.
CPC ............ *H04L 1/0034* (2013.01); *H04J 11/004* (2013.01); *H04L 1/0046* (2013.01); *H04L 1/0048* (2013.01); *H04L 1/0072* (2013.01); *H04L 5/0053* (2013.01); *H04L 5/0073* (2013.01)

(58) Field of Classification Search
CPC . H04W 72/02; H04W 72/08; H04W 72/082; H04W 88/02; H04L 1/0034; H04L 5/0073; H04L 5/0053; H04L 1/0046; H04L 1/0048; H04L 1/0072
USPC ........................................................ 370/329
See application file for complete search history.

(56) References Cited

U.S. PATENT DOCUMENTS

| 2011/0038275 A1 | 2/2011 | Kim et al. |
| 2011/0044269 A1 | 2/2011 | Fan et al. |
| 2011/0182385 A1 | 7/2011 | Doan et al. |
| 2011/0305198 A1 | 12/2011 | Aue et al. |

(Continued)

FOREIGN PATENT DOCUMENTS

| KR | 10-2012-0053023 A | 5/2012 |
| WO | 2013066935 A1 | 5/2013 |

*Primary Examiner* — Sai-Ming Chan
(74) *Attorney, Agent, or Firm* — Jefferson IP Law, LLP

(57) ABSTRACT

An interference signal control information acquisition method and apparatus for use in the wireless communication system is provided. The interference signal information detection method of a terminal for use in a wireless communication system includes acquiring a first control information part and a second control information part of other users from a received signal, generating a first control information candidate identical in bit length with the first control information part, blindly decoding first control information based on the first control information candidate, and detecting and removing interference signals of the other users from the received signal based on the blindly decoded first control information.

18 Claims, 8 Drawing Sheets

(56) References Cited

U.S. PATENT DOCUMENTS

2013/0114429 A1    5/2013   Jonsson et al.
2013/0121168 A1*   5/2013   Luo .................... H04W 72/042
                                                              370/242
2013/0163543 A1*   6/2013   Freda ................ H04W 72/0406
                                                              370/329

* cited by examiner

INTERFERENCE SIGNAL CONTROL INFORMATION ACQUISITION METHOD AND APPARATUS FOR USE IN WIRELESS COMMUNICATION SYSTEM

CROSS-REFERENCE TO RELATED APPLICATION(S)

This application claims the benefit under 35 U.S.C. §119 (e) of a U.S. Provisional application filed on Aug. 23, 2013 in the U.S. Patent and Trademark Office and assigned Ser. No. 61/869,260, and under 35 U.S.C. §119(a) of a Korean patent application filed on Jan. 3, 2014 in the Korean Intellectual Property Office and assigned Serial number 10-2014-0000537, the entire disclosure of which is hereby incorporated by reference

TECHNICAL FIELD

The present disclosure relates to a wireless communication system. More particularly, the present disclosure relates to an interference signal control information acquisition method and apparatus for use in the wireless communication system.

BACKGROUND

Mobile communication systems were developed to provide subscribers with voice communication services on the move. With the rapid advancement of technologies, current mobile communication systems have evolved to support high speed data communication services beyond the voice-oriented services. However, limited resource and user requirements for higher speed services in the current mobile communication systems spur the evolution to more advanced mobile communication systems.

If a terminal is capable of canceling interference signals based on information on Multiple Access Interference (MAI) and inter-cell interference information, this may contribute to enhancement of reception performance of the terminal Such interference information increases the accuracy of the interference signal model in Multiuser Multiple Input Multiple Output (MIMO) and in a cell edge environment such that the terminal is capable of cancelling interference more effectively.

In the wireless communication system such as High Speed Packet Access (HSPA), however, a base station has to perform an additional operation of scrambling of encoded data using a terminal-specific identifier, e.g. a Radio Network Temporary Identifier (RNTI). In this case, since the terminal does not know the identifiers of other terminals, it is difficult to acquire control information of the other terminals.

There is therefore a need of a research on a method for the terminal itself to cancel interference signals.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an interference signal blind detection method and apparatus of a terminal for use in a cellular wireless communication system.

In accordance with an aspect of the present disclosure, an interference signal information detection method of a terminal for use in a wireless communication system is provided. The interference signal detection method includes acquiring a first control information part and a second control information part of other users from a received signal, generating a first control information candidate identical in bit length with the first control information part, blindly decoding first control information based on the first control information candidate, and detecting and removing interference signals of the other users from the received signal based on the blindly decoded first control information.

In accordance with another aspect of the present disclosure, a terminal for acquiring interference signal information for use in a wireless communication system is provided. The terminal includes a transceiver configured to transmit and receive signals to and from a base station and a controller configured to control acquiring a first information part and a second control information part of other users from a received signal, to generate a first control information candidate identical in bit length with the first control information part, to blindly decode the first control information based on the first control information candidate, and to detect and to remove interference signals of the other users from the received signal based on the blindly decoded first control information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
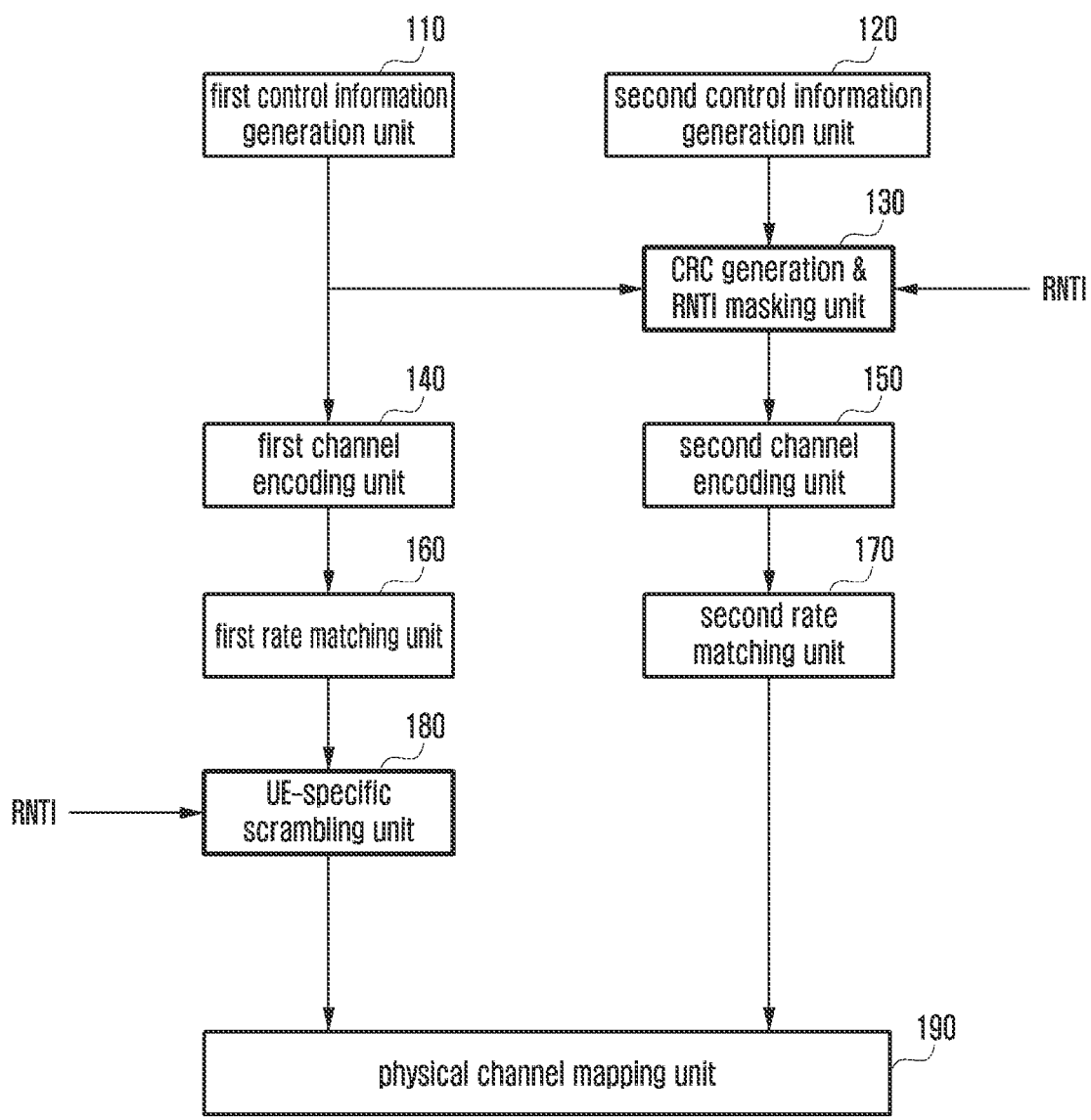
FIG. 1 is a diagram illustrating a configuration of an apparatus for generating a High Speed-Signaling Control Channel (HS-SCCH) as a common control channel carrying a control information on a High Speed-Downlink Shared Channel (HS-DSCH) in High Speed Downlink Packet Access (HSDPA) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, detailed description of the functions and structures well-known in the art and technical content not directly related to the present disclosure may be omitted herein. This aims to omit unnecessary description so as to make the subject matter of the present disclosure clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

Advantages and features of the present disclosure and methods of accomplishing the same may be understood more readily by reference to the following detailed description of various embodiments and the accompanying drawings. The present disclosure may, however, be embodied in many different forms and should not be construed as being limited to the various embodiments set forth herein. Rather, these various embodiments are provided so that this disclosure will be thorough and complete and will fully convey the concept of the present disclosure to those skilled in the art, and the present disclosure will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic functions. Moreover, it should be noted that the functions of the blocks may be performed in different order in several modifications. For example, two successive blocks may be performed substantially at the same time, or may be performed in reverse order according to their functions.

The term "module" according to the embodiments of the present disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The present disclosure relates to an interference cancellation method based on the interference signal information, particularly, interference signal control information, extraction technology for reception performance enhancement within an interference area in a cellular wireless communication system.

A terminal obtains reception performance gain by removing interference signals based on the Multiple Access Interference (MAI) or Inter-Cell Interference (ICI) information. Such interference information increases an accuracy of the interference signal model in Multiuser Multiple Input Multiple Output (MIMO) and a cell edge environment, such that the terminal is capable of cancelling interference more effectively.

The present disclosure relates to a method for detecting such interference information blindly in a $3^{rd}$ Generation (3G) High Speed Packet Access (HSPA) system.

In a wireless communication system, if a terminal attaches to a base station, the base station assigns a unique User Equipment (UE) Identifier (ID) to the terminal for identification. Meanwhile, the base station allocates a data channel to a target UE in such a way of sending a target terminal, i.e., the target UE, the data channel information and a target UE ID through the common downlink control channel.

Then each terminal compares the UE ID acquired as a result of control channel decoding with an assigned UE ID to determine whether to perform data channel decoding.

FIG. 1 is a diagram illustrating a configuration of an apparatus for generating a High Speed-Signaling Control Channel (HS-SCCH) as the common control channel carrying the control information on a High Speed-Downlink Shared Channel (HS-DSCH) in High Speed Downlink Packet Access (HSDPA) according to an embodiment of the present disclosure.

A first control information generation unit 110, which may generate HS-SCCH part 1, and a second control information generation unit 120, which may generate HS-SCCH part 2, generates modulation indices and codes allocation information to the respective data channels, such as HS-DSCHs.

A Cyclic Redundancy Check (CRC) generation & Radio Network Temporary Identifier (RNTI) masking unit 130 generates 16-bit CRC information as an error detection code using the first control information, such as the HS-SCCH part 1, and the second control information, such as the HS-SCCH part 2, to check a presence/absence of error in the decoding result. The CRC generation & RNTI masking unit 130 masks the 16-bit CRC with the UE ID, i.e., the RNTI, to check whether resource allocation to the corresponding terminal is available. The CRC generation & and RNTI masking unit 130 adds the masked CRC to the end of the second control information, the HS-SCCH part 2, which is transferred to the encoding unit.

The encoding unit consists of a first channel encoding unit 140 to perform encoding of channel 1, and the second channel encoding unit 150 to perform encoding of channel 2, that are responsible for encoding the first control information, i.e., the HS-SCCH Part 1, and the second control information, i.e., the HS-SCCH Part 2, respectively.

Likewise, a rate matching unit consists of a first rate matching unit 160 to perform Rate Matching 1, and a second rate matching unit 170 to perform Rate Matching 2.

A UE-specific scrambling unit 180 is a function block of scrambling on only the first control information. The UE-specific scrambling unit 180 generates a random scrambling code based on the UE ID, e.g. the RNTI, and performs scrambling on the output of the first rate matching unit 160 with the generated code. Additionally, the apparatus of FIG. 1 includes a physical channel mapping unit 190.

As analogized from the above description, the second control information can be decoded without thee UE ID, i.e., the RNTI, while the first control information cannot be descrambled with UE ID.

Figure 2:
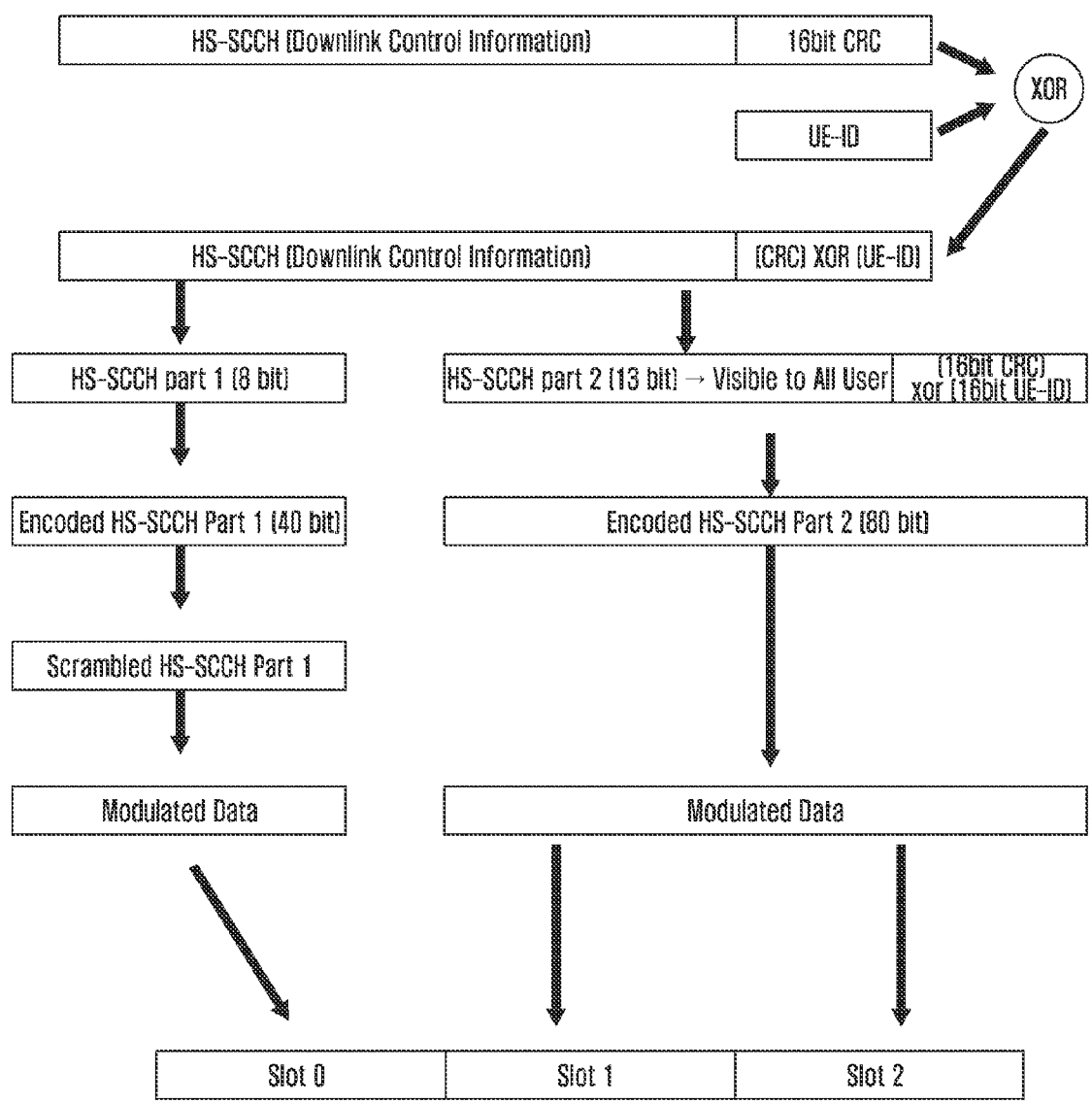
FIG. 2 is a diagram illustrating a procedure of generating control information according to an embodiment of the present disclosure.

FIG. 2 is a diagram illustrating a procedure of generating control information according to an embodiment of the present disclosure.

Since features depicted in FIG. 2 is similar to that of FIG. 1, with the exception that the information is expressed in length of bits, detailed description thereon is omitted herein.

Figure 3:
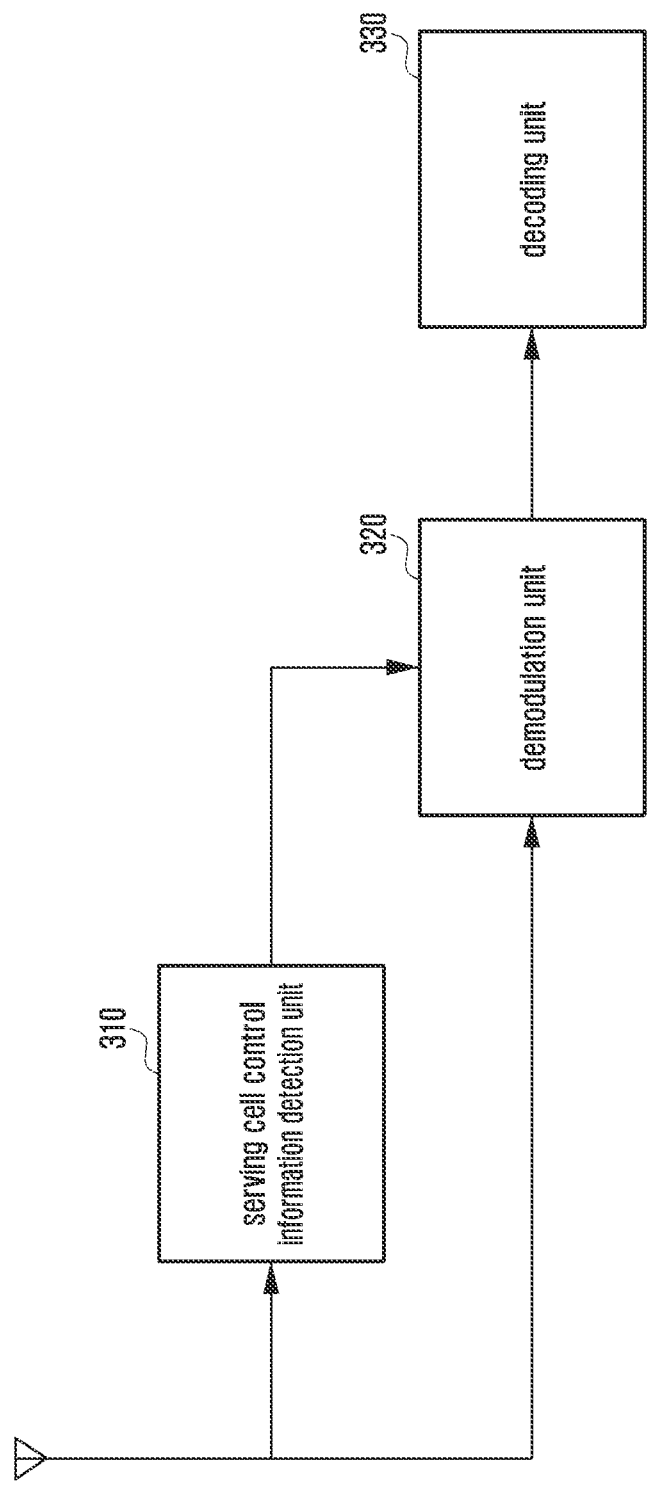
FIG. 3 is a block diagram illustrating a configuration of a normal HSDPA receiver according to an embodiment of the present disclosure.

FIG. 3 is a block diagram illustrating a configuration of a HSDPA receiver according to an embodiment of the present disclosure.

Referring to FIG. 3, the HSDPA receiver may include a serving cell control information detection unit 310, a demodulation unit 310, and a decoding unit 330.

The serving cell control information detection unit 310, which detects the HS-SCCH, performs demodulation and decoding on the received control information, the HS-SCCH using the UE ID, i.e., the RNTI, assigned by the serving cell. The serving cell control information detection unit 310 verifies validity of the decoding result. If the decoding result is valid, the serving cell control information detection unit 310 sends the demodulation unit 320 the information on the data channel, i.e., the HS-DSCH, extracted from the decoding result of the first control information, i.e., the HS-SCCH part 1, and the second control information, i.e., the HS-SCCH part 2.

The demodulator 320, which performs HS-DSCH demodulation, demodulates the received signal into the data channel, i.e., the HS-DSCH, using the modulation index and assigned code resource that are extracted from the control information, i.e., the HS-SCCH. The demodulation unit 310 sends the decoding unit 330 the demodulation result.

The decoding unit 330 decodes the data channel to acquire the data transmitted by the base station.

Figure 4:
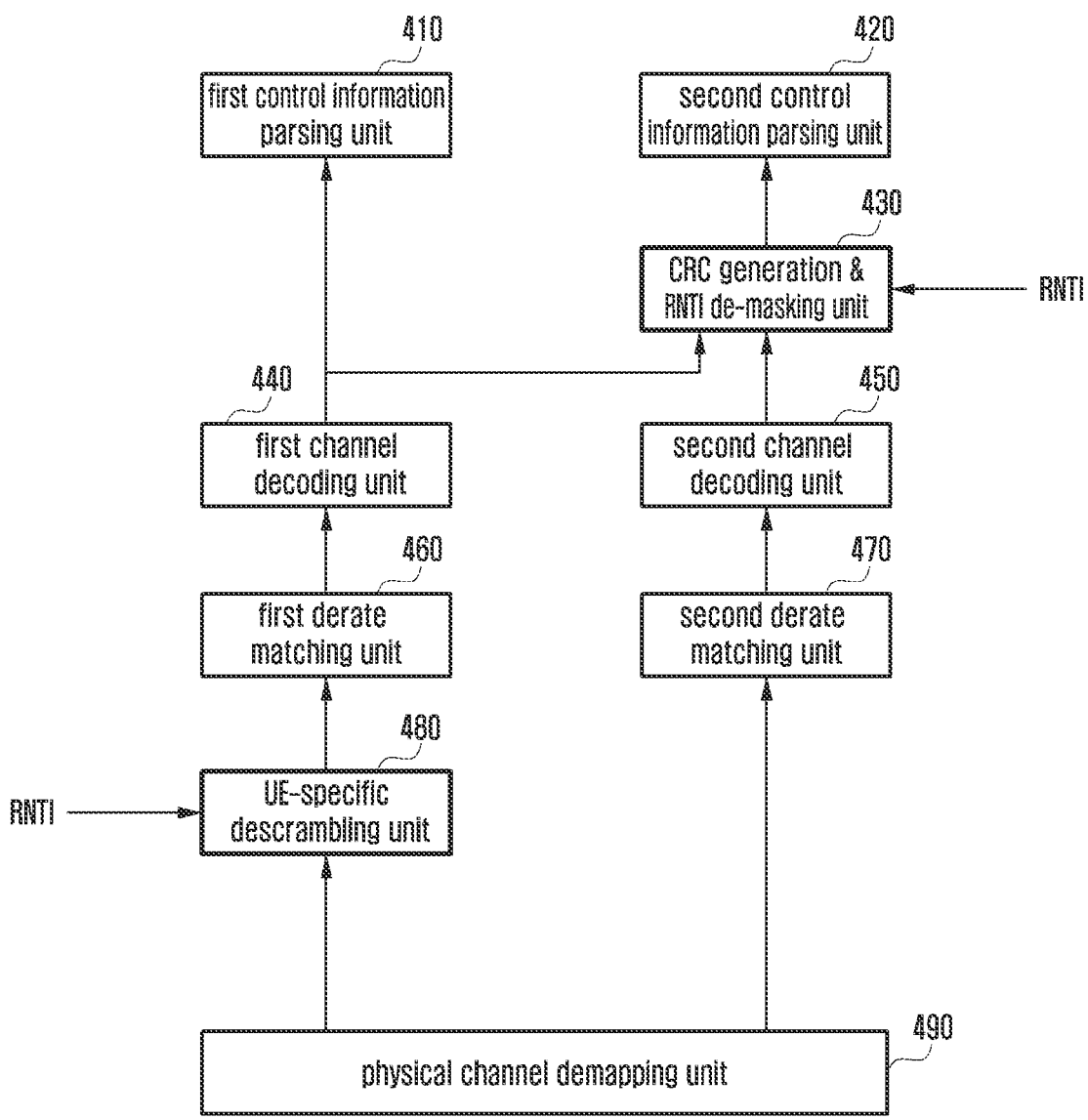
FIG. 4 is a diagram illustrating a control information processing method according to an embodiment of the present disclosure.

FIG. 4 is a diagram illustrating a control information processing method according to an embodiment of the present disclosure.

For the control information, i.e., the HS-SCCH, the CRC bits are generated based on first control information bits, i.e., part 1 bits, and second control information bits, i.e., part 2 bits. Accordingly, in order to decoding all the controls information bits, i.e., HS-SCCH information bits, detection and decoding on both the first and second control information and checking of the CRC result should be performed.

At this time, a higher layer notifies of channelization codes of up to 4 other users including the channelization code of the control information, i.e., the HS-SCCH, of the corresponding terminal. As a consequence, the terminal has to check all the CRC results for about up to 4 control information, i.e., the HS-SCCHs, to select the control information bits, i.e., the HS-SCCH information bits, allocated to the terminal.

Referring to FIG. 4, a physical channel demapping unit 490 performs physical channel demapping on the symbols included in the slot 0 of the subframe to decode the first control information bits, i.e., the part 1 information bits.

Then a UE-specific descrambling unit 480 performs unmasking on the de-mapped symbols using the UE ID, in this case, the UE ID unmasked with the first control information may be obtained by extending the unique UE ID to 40 bits to be fit for a 3G Partnership Project (3GPP) standard.

A first derate matching unit 460 performs derate matching on the unmasked symbols.

A first channel decoding unit 440 performs Viterbi decoding on the derate-matched symbols.

In the UE ID unmasking process, a codeword of the corresponding control information, i.e., the HS-SCCH, is recovered correctively while codewords of the other user's HS-SCCHs are further distorted such that the decoder output metric values of the control information, i.e., the HS-SCCHs, assigned to the other users differ from the decoder output metric value of the control information, i.e., the HS-SCCH, of the corresponding terminal. The first channel deciding unit 440 compares the metrics among each other to select the control information, i.e., the HS-SCCH, having the highest reliability as the bits of the first control information, i.e., the HS-SCCH part 1.

Then a first control information parsing unit 410 detects and decodes the second control information bits contained in the first and second slots using the channelization code of the selected control information, i.e., the HS-SCCH.

Likewise, a second control information decoding procedure is performed in the inverse order of the encoding procedure.

Second control information symbols detected with the channelization code are processed by the physical channel demapper unit 490, the second derate matching unit 470 that performs derate matching 2, and a second channel decoding unit 450, which may perform Viterbi decoding, in the sequential order. A CRC check & RNTI de-masking unit 430 adds the decoded first control information bits to the bits acquired through the above process and performs CRC thereon to determine whether decoding is successful or not and provides the added bits to a second control information parsing unit 420.

Figure 5:
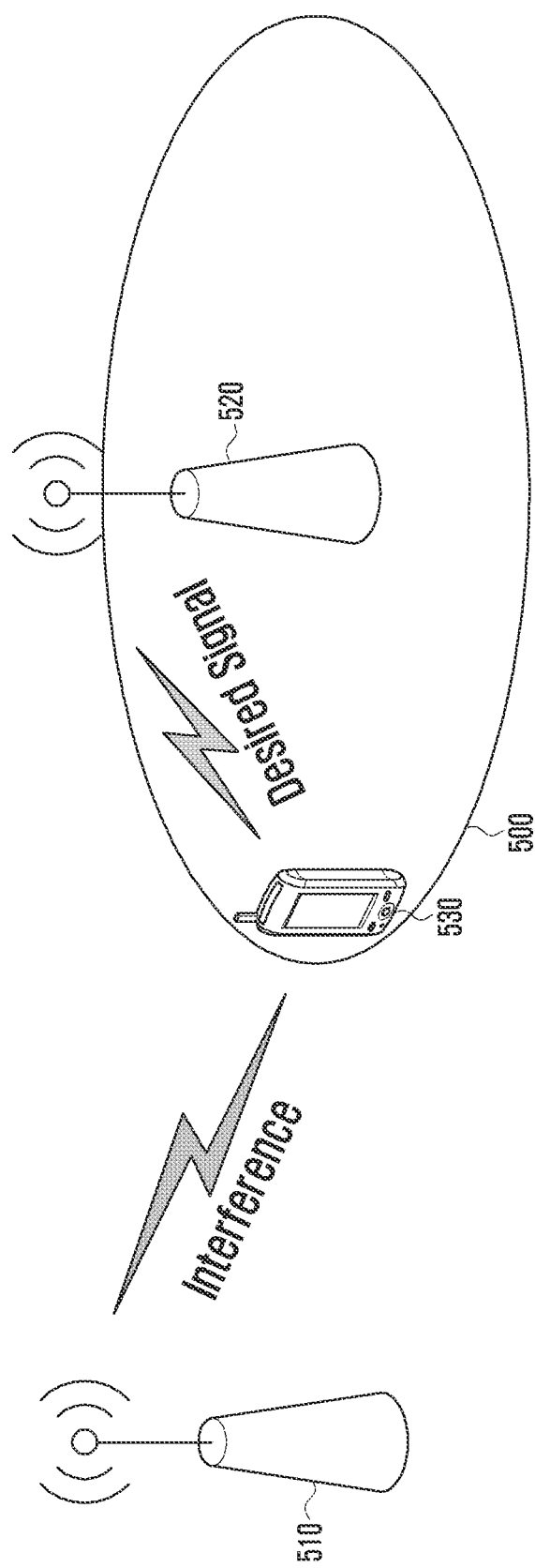
FIG. 5 is a diagram illustrating an exemplary situation where a terminal located at a cell edge is affected by interference in a cellular wireless communication system according to an embodiment of the present disclosure.

FIG. 5 is a diagram illustrating an exemplary situation where a terminal located at a cell edge is affected by interference in a cellular wireless communication system according to an embodiment of the present disclosure.

Referring to FIG. 5, there may be interference from a neighboring cell at a cell edge area 500 in the cellular wireless communication system. Typically, a signal received by a terminal 530 may include inter-cell interference signals from a neighboring cell 510 as well as a signal transmitted from a serving base station 520 to the terminal 530. As a consequence, the interference signal from the neighboring cell 510 causes performance degradation in demodulating the signal received from the serving cell 520.

If the terminal 530 is capable of acquiring the information on the interference signal, it may be possible to improve the reception performance by reflecting the information on the interference signal to demodulation of the received signal, or in other words, by demodulating the received signal according to the information on the interference signal. In order to extract the information on the interference signal, the terminal 530 may use enhanced interference cancellation algorithms, such as a joint detection algorithm guaranteeing superior reception performance.

In a wireless communication standard, such as normal HSPA, however, the terminal 530 can receive only its own serving cell RNTI. This means that the terminal 530 cannot extract the information on the interferer cell and interference signals, and thus, is restricted in inter-cell interference cancellation. In the exemplary case of HSPA, since the encoded data is scrambled with RNTI as the terminal identifier, the HSPA control information, i.e., the HSPA HS-SCCH may not be decoded without the RNTI of the corresponding terminal.

The present disclosure proposes a method capable for solving the above problem. In detail, a terminal according to an embodiment of the present disclosure decodes and detects control information about other terminals blindly and reflects the control signals of the other terminals in processing the received signal. A description is made of the features of the present disclosure hereinafter in detail.

Figure 6:
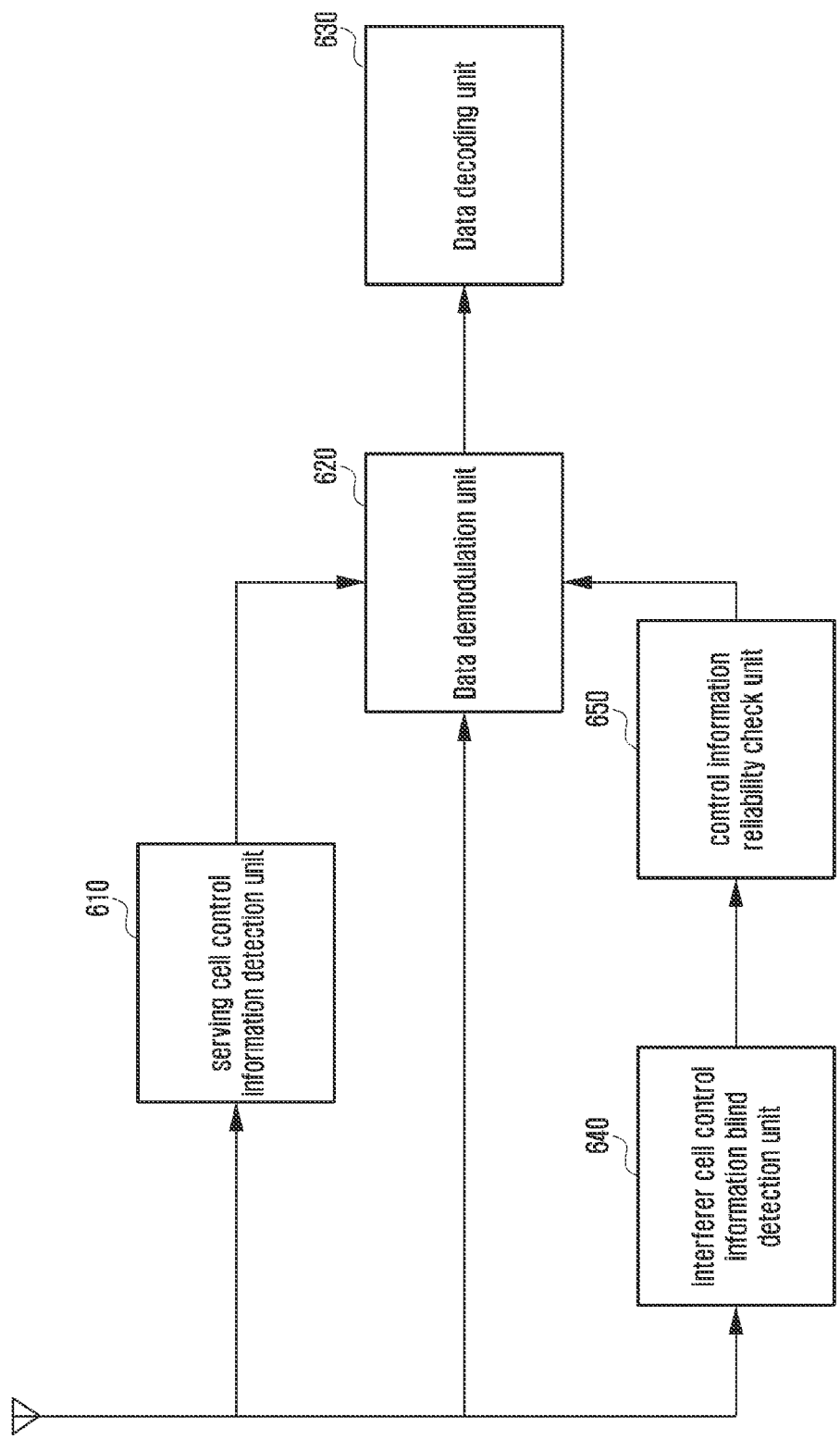
FIG. 6 is a block diagram illustrating a configuration of a receiver according to an embodiment of the present disclosure.

FIG. 6 is a block diagram illustrating a configuration of the receiver according to an embodiment of the present disclosure.

A serving cell control information detection unit 610, which may also be referred to as a service cell HS-SCCH detector 610, performs demodulation and decoding on the control information, i.e., the HS-SCCH, received using the UE ID, e.g. the RNTI, assigned by the serving cell and verifies the validity of the received control information. If the control information is valid, the serving cell control information detection unit 610 sends the information on the HS-DSCH extracted from the decoding result of the first control information, i.e., the HS-SCCH part 1, and the second control information, i.e., the HS-SCCH part 2, to a data demodulation unit 620, which may also be referred to as a HS-DSCH demodulator 620.

An interferer cell control information blind detection unit 640, which may also be referred to as an Interfering Cell HS-SCCH Blind Detector 640, performs demodulation on the interferer cell signal. The interferer cell control information blind detection unit 640 generates a candidate UE ID, i.e., the candidate RNTI, and decoded control information through blind HS-SCCH detection. The interferer cell control information blind detection unit 640 sends the candidate UE ID and the decoded control information along with the reliability information to a control information reliability checking unit 650, which may also be referred to as a HS-SCCH Info Reliability Check 650.

A control information reliability checking unit 650, which performs a HS-SCCH Info Reliability Check, determines whether the interference information extracted blindly using the reliability information on the decoding result, such as a soft metric of the decoding unit, is valid. If the interference information is valid, the control information reliability checking unit 650 sends the data demodulation unit 620, which may also be referred to as the HS-DSCH demodulator 620, the decoded information for use in cancelling interference.

A data decoding unit 630 may provide the reliability information, e.g. the soft metric, on the data decoded finally as a by-product of decoding.

In the best channel environment, e.g. with high SNR, decoding errors hardly occur and, at this time, the reliability has very high value. In the case that the reliability is high, it may be determined that the decoding is successful and thus that the related other user control information, i.e., the HS-SCCH, is valid.

In a similar way, the data decoding unit 630 may re-encode the decoded data to extract the reliability information based on the difference from the input data. The control information, i.e., the HS-SCCH, determined as valid is sent to the interference cancellation receiver for use in demodulating data channel.

The data demodulation unit 620, i.e., the HS-DSCH demodulator 620, may remove the interference signal from the received signal using a modulation index, e.g. a modulation order, and allocated code resources that are extracted from the serving and interferer control information. The modulation unit 620 may demodulate the data of the serving cell and send the demodulation result to the data decoding unit 630.

Although the description is directed to an exemplary case where the terminal includes a plurality of units, the present disclosure is not limited thereto. For example, the terminal may include a transceiver for transmitting and receiving signals to and from a base station and a controller for controlling overall operations of the terminal.

In this case, the control unit acquires the first and second control information parts about the other user from the received signal, generates the first candidate control information corresponding to a bit length of the first control information part, performs blind decoding on the first control information based on the first candidate control information, and detects and removes the interference signal of other users from the received signal based on the blindly-decoded first control information.

The terminal may be implemented according to various embodiments without limitation to any embodiment of the present disclosure.

Figure 7:
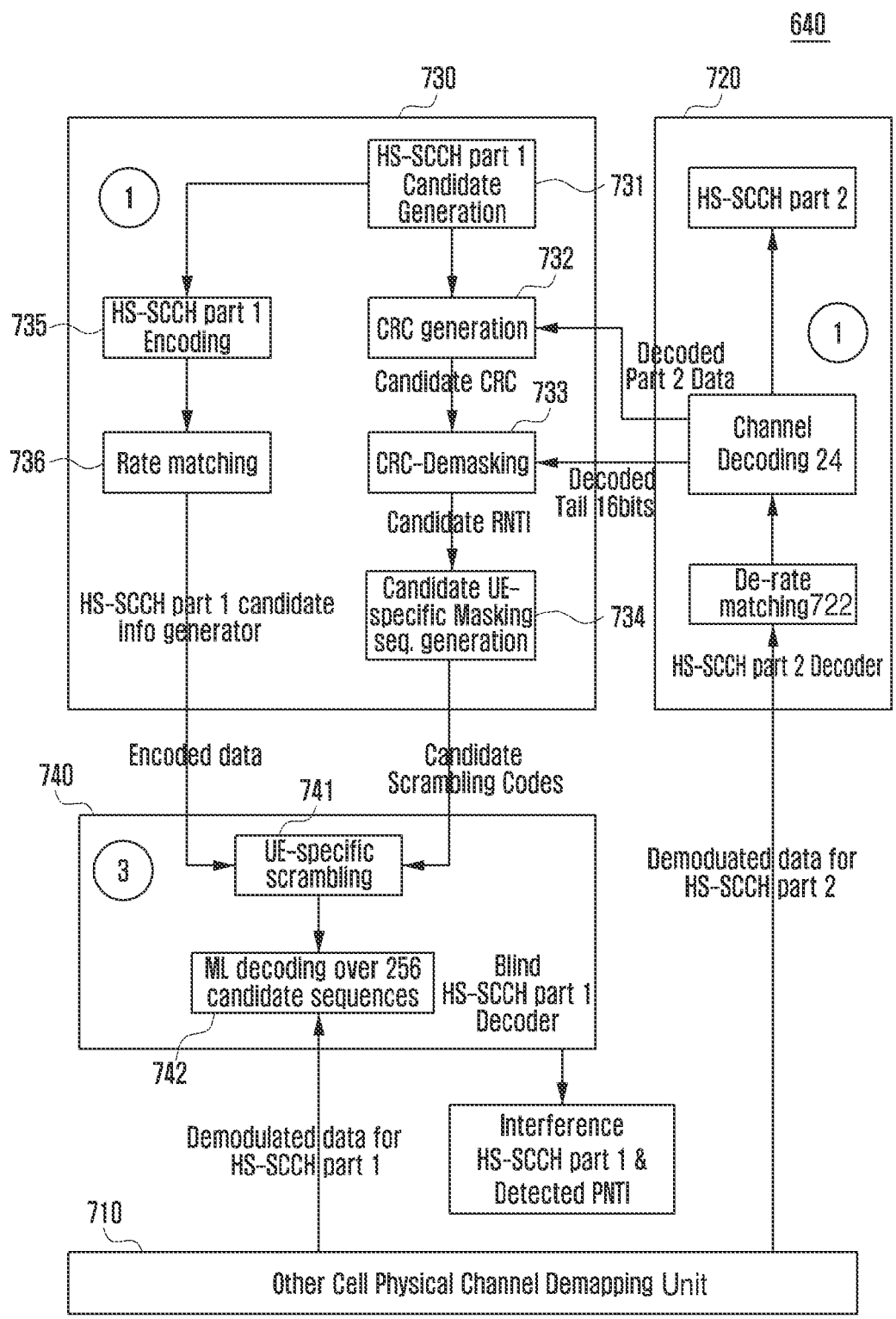
FIG. 7 is a block diagram illustrating a configuration of an interferer cell control information blind detection unit of FIG. 6 according to an embodiment of the present disclosure.

FIG. 7 is a block diagram illustrating a configuration of an interferer cell control information blind detection unit of FIG. 6 according to an embodiment of the present disclosure.

Referring to FIG. 7, the interferer cell control information blind detection unit 640 may include an other cell physical channel demapping unit 710, a second control information decoder 720, a first control information candidate information generator 730, and a first control information blind decoder 740.

The other cell physical channel demapping unit 710 demodulates the signals of other cells from the received signal and outputs the first control information, i.e., the demodulated HS-SCCH part 1, and the second control information, i.e., the HS-SCCH part 2.

In this case, the second control information, i.e., the HS-SCCH part 2, can be decoded through a second derate matching unit 722, to perform Derate matching 2, and a second channel decoding unit 724, to perform channel decoding 2, of the first control information decoder 720 because of no necessity of the UE ID, i.e., the RNTI.

For the first control information blind decoding, i.e., the HS-SCCH part 1 blind decoding, the decoded second control information, i.e., the HS-SCCH part 2, and the 16 bits of tail of the decoded second control information, i.e., the HS-SCCH part 2, which has been decoded through masking with the CRC and the RNTI are sent to the first control information blind decoder 740.

The first control information includes 8-bit information. That is, the first control information may be made up of 8 information bits. Accordingly, the first control information may indicate up to 256 types of candidate data and allow a first control information candidate information generator 731, which may perform HS-SCCH part 1 candidate generation, to the corresponding encoding data.

A CRC generation unit 732 generates 256 CRC candidates based on the first control information candidate, i.e., the HS-SCCH part 1 candidate, assumed and the second control information acquired by the second control information decoding unit 720, which performs HS-SCCH part 2 decoding.

A CRC de-masking unit 733 de-masks the tail 16 bits as a decoding result of the second control information, i.e., the HS-SCCH part 2, with the candidate CRCs to generate 256 candidate RNTIs.

A candidate UE-specific masking sequence generation unit 734 generates 256 candidate scrambling sequences for scrambling the control information encoding data, i.e., the HS-SCCH encoding data, using the candidate RNTIs according to a predetermined rule.

The 256 candidate HS-SCCH data generated by the first control information candidate generation unit 731, which may perform HS-SCCH part 1 candidate generation, are processed by a first control information encoding unit 735, which may perform HS-SCCH part 1 encoding, and a rate matching unit 736 so as to generate 256 encoded candidate first control information data, i.e., the candidate HS-SCCH part 1 encoded data.

The first control information blind decoder 740, which may also be referred to as a Blind HS-SCCH Part 1 Decoder 740, measures correlation coefficients between the UE-specific scrambled encoded data candidates with the data demodulated with the first control information by the demodulation unit. The first control information blind decoder 740 selects the first control information candidate having the highest correlation coefficient.

A UE-specific scrambling unit 741, which performs UE-specific scrambling, generates scrambling results using the 256 encoded data candidates and the corresponding scrambling code candidates.

A Maximum Likelihood (ML) decoding unit 742 calculates correlation coefficient between the modulated first control information data, i.e., the HS-SCCH part 1 demodulated data, received from the other cell physical channel demapping unit 710 and the 256 scrambled encoded data generated by the UE-specific scrambling unit.

Figure 8:
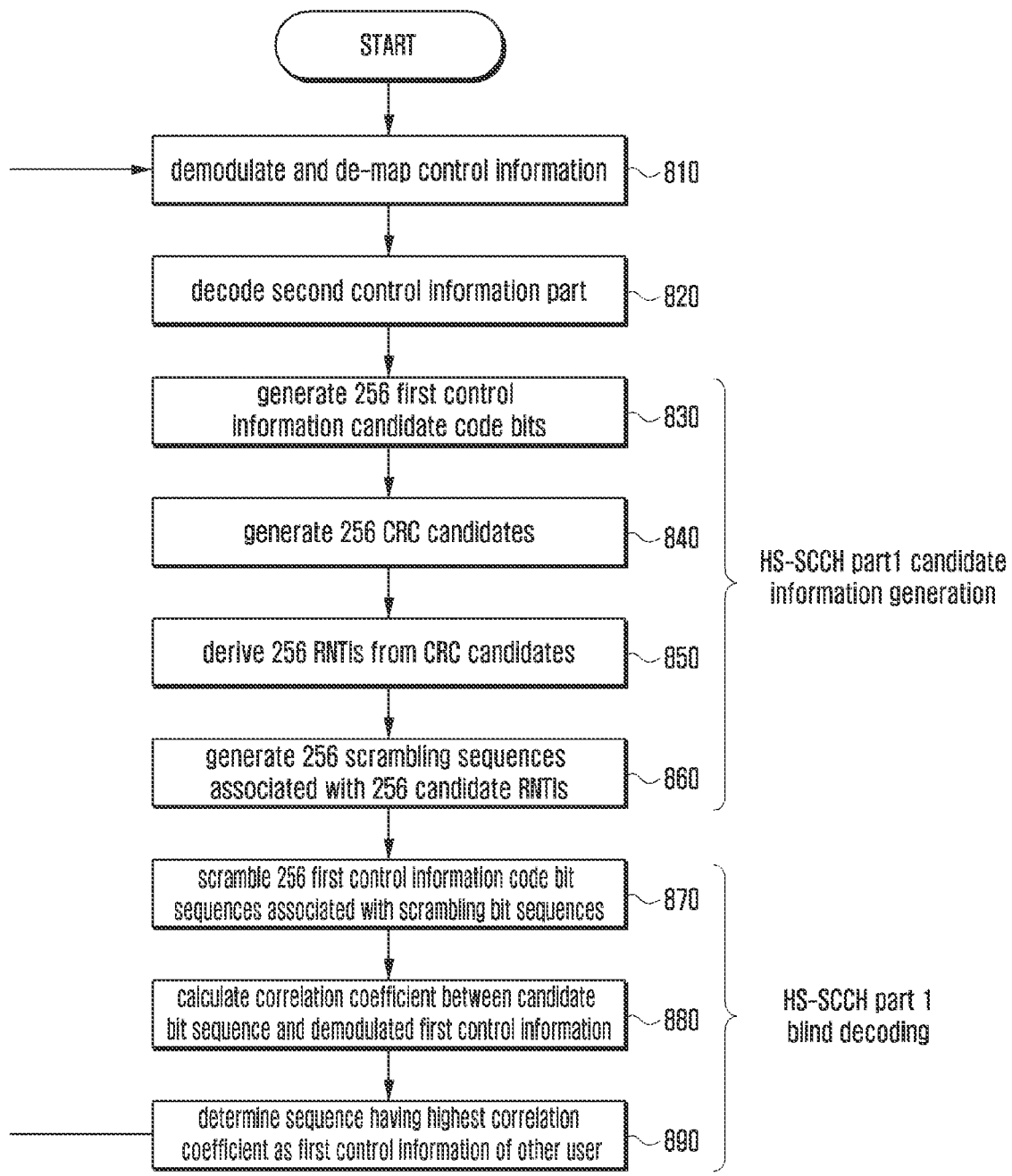
FIG. 8 is a flowchart illustrating an interference cancellation procedure of a terminal according to an embodiment of the present disclosure.

FIG. 8 is a flowchart illustrating an interference cancellation procedure of a terminal according to an embodiment of the present disclosure.

The interference cancellation procedure of the terminal according to an embodiment of the present disclosure includes an operation of acquiring first and second information parts of another user, generating a first control information candidate matching a first control information part in bit length, decoding the first control information blindly based on the first control information candidate, and detecting an interference signal of the other user from a received signal based on the first control information decoded blindly.

Referring to FIG. 8, a method of detecting and cancelling the interference signal based on the first control information decoded blindly.

The interference cancellation procedure is described in more detail hereinafter with reference to FIG. 8.

The terminal first performs control information demodulation and demapping at operation S810. This may include detecting the second control information symbol of the other users, i.e., another user HS-SCCH part 2 symbol, which the terminal is monitoring currently using the channelization code notified by a higher layer. Through this process, the terminal may acquire the first and second control information parts about the other user.

Next, the terminal decodes the second control information part at operation S820. For this purpose, the terminal detects and decodes the second control information through physical channel demapping, derate matching, and channel decoding. As a result of this process, the terminal may acquire the decoded bit information of the second control information. The terminal may determine the decoded second control information part as the second control information.

Next, the terminal generates 256 coded bits candidates for the first control information part at operation S830. In the case of HS-SCCH type 1, the first control information part, i.e., part 1, is 8 bits long. Accordingly, it is necessary to consider 256 bit sequences as candidates of the first control information part.

Next, the terminal generates 256 CRC candidates corresponding to the 256 first control information part candidates at operation S840. As described above, since only the CRC bits mask the UE ID in the course of encoding the second control information, the information bits remain as they were without being processed.

Accordingly, the terminal combines the 256 candidate bit sequences corresponding to the first control information part and the second control information part, i.e., part 2 information, to generate 256 CRC candidates.

Next, the terminal derives 256 UE IDs, e.g. RNTIs, from the 256 CRC candidates at operation S850. In order to accomplish this, the terminal compares the 256 CRC candidates and the CRC parts of the second control information bits decided so as to estimate the UE ID masked by referencing the first control information sequence (part 1 information sequence).

Through the above process, 256 16-bit UE ID candidates are generated.

Next, the terminal generates 256 scrambling sequences related to and/or associate with the 256 RNTI candidates at operation S860. In detail, the terminal processes the 256 16-bit UE IDs or RNTIs estimated at the previous operation to generate 40-bit masking sequences according to a standard.

Next, the terminal scrambles, i.e., masks, the coded bit sequences with 256 candidates of the first control information bits, i.e., bit sequences, or in other words, scrambles the 256 first control information code bit sequences associated with scrambling bit sequences, at operation S870. In detail, the terminal masks 256 40-bit masking patterns generated at the previous operation with the first control information candidates encoded and rate-matched. The masking process may be referred to as blind decoding operation in an embodiment of the present disclosure.

Next, the terminal calculates correlation coefficients between candidate bit sequences, i.e., the masked candidates of the first control information and the demodulated first control information of the received signal at operation S880. That is, the terminal calculates the correlation coefficients between the 256 masked 40-bit information generated at the previous operation and the decoded first control information of other user. The terminal selects and/or determines finally the first control information corresponding to the sequence of the highest correlation coefficient as the first control information of the other user.

The correlation coefficient for use in the above process can be expressed as Equation 1.

$$m_k = \sum_{i=1}^{Nbit} c_k[i] y[i] \qquad \text{Equation 1}$$

$c_k[i]$: $i^{th}$ bit value of $k^{th}$ scrambled encoded data candidate
$y[i]$: $i^{th}$ soft bit value of demodulated data
$m_k$: correlation coefficient between $k^{th}$ scrambled encoded data candidate and demodulated data
Nbit: number of encoded data coded bits Finally, the terminal sends the first control information having the greatest correlation coefficient, the RNTI candidate, and the correlation coefficient for reliability check to the control information reliability check device, or in other words, the terminal determines a sequence having a highest correlation coefficient as first control information of the other user at operation S890.

If the reliability is verified, the terminal determines the first control information as the control information of the other user.

The determined first information of the other user may include channelization code and modulation index information associated with the data channel for the other user. With the channelization code and modulation index information associated with the data channel of the other user, the terminal is capable of checking the interference signal of the other user.

Accordingly, the terminal is capable of removing interference signals caused by other users from the received signal to acquire the desired signal.

The interference signal control information acquisition method and apparatus of the present disclosure is advantageous in terms of removing interference signal from the received signal in such a way of detecting the control signals of other users blindly and extracting the information on the interference signal of the other users.

As described above, the interference signal control information acquisition method and apparatus of the present disclosure is capable of detecting the control information of other users blindly. The interference signal control information acquisition method and apparatus of the present disclosure is advantageous in terms of canceling interference signals based on the interference signal information acquired from the blindly detected control information of other users.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An interference signal information detection method of a terminal in a wireless communication system, the method comprising:
    acquiring a first control information part and a second control information part of other users from a received signal;
    generating a plurality of first control information candidates corresponding to bit length of the first control information part;
    blindly decoding first control information based on the first control information candidate; and
    detecting and removing interference signals of the other users from the received signal based on the blindly decoded first control information.

2. The method of claim 1, wherein the acquiring of the first control information part and the second control information part comprises decoding second control information from the second control information part.

3. The method of claim 2,
    wherein the first control information part is 8 bits long, and
    wherein the generating of the plurality of first control information candidates comprises generating 256 candidates of first control information bits.

4. The method of claim 3, wherein the generating of the plurality of first control information candidates comprises:
    generating candidate cyclic redundancy check (CRC) information based on candidates of the first control information bit and the decoded second control information; and
    acquiring a candidate terminal identifier from the generated candidate CRC information.

5. The method of claim 4, wherein the blindly decoding of the first control information blindly comprises:
    generating a masking sequence based on the acquired candidate terminal identifier; and
    encoding the candidate of the first control information bit based on the masking sequence.

6. The method of claim 5, wherein the blindly decoding of the first control information comprises determining the first control information of the other user based on the received signal and a result of the encoding of the candidate of the first control information bit.

7. The method of claim 6, wherein the blindly decoding of the first control information comprises determining the candidate of the first control information bit which has a highest correlation with the received signal to be the first control information.

8. The method of claim 7,
wherein the first control information part and the second control information part are for a high-speed signaling control channel (HS-SCCH), and
wherein the candidate terminal identifier is a radio network temporary identifier (RNTI).

9. The method of claim 1, wherein the detecting and the removing of the interference signals comprises:
checking a channelization code and modulation index applied to a data channel of the other user from the first control information; and
removing the interference signal from the received signal based on the channelization code and modulation index.

10. A terminal for acquiring interference signal information in a wireless communication system, the terminal comprising:
a transceiver configured to transmit and receive signals to and from a base station; and
a controller configured to:
control acquiring a first control information part and a second control information part of other users from a received signal,
generate a plurality of first control information candidates corresponding to bit length of the first control information part,
blindly decode the first control information based on the first control information candidate, and
detect and remove interference signals of the other users from the received signal based on the blindly decoded first control information.

11. The terminal of claim 10, wherein the controller is further configured to control decoding second control information from the second control information part.

12. The terminal of claim 11,
wherein the first control information part is 8 bits long, and wherein the controller is further configured to generate 256 candidates of first control information bits.

13. The terminal of claim 12, wherein the controller is further configured to:
control generating candidate cyclic redundancy check (CRC) information based on candidates of the first control information bit and the decoded second control information, and
control acquiring a candidate terminal identifier from the generated candidate CRC information.

14. The terminal of claim 13, wherein the controller is further configured to:
control generating a masking sequence based on the acquired candidate terminal identifier, and
control encoding the candidate of the first control information bit based on the masking sequence.

15. The terminal of claim 14, wherein the controller is further configured to control determining the first control information of the other user based on the received signal and a result of the encoding of the candidate of the first control information bit.

16. The terminal of claim 15, wherein the controller is further configured to control determining the candidate of the first control information bit which has a highest correlation with the received signal to be the first control information.

17. The terminal of claim 16,
wherein the first control information part and the second control information part are for a high-speed signaling control channel (HS-SCCH), and
wherein the candidate terminal identifier is a radio network temporary identifier (RNTI).

18. The terminal of claim 10, wherein the controller is further configured to:
control checking a channelization code and modulation index applied to a data channel of the other user from the first control information, and
control removing the interference signal from the received signal based on the channelization code and modulation index.

* * * * *